United States Patent Office 3,493,537
Patented Feb. 3, 1970

3,493,537
DISCOLORATION INHIBITORS FOR AN ETHYL-
ENE-VINYL ACETATE COPOLYMER
Ival O. Salyer, Dayton, Ohio, and Harry P. Holladay,
Creve Coeur, Mo., assignors to Monsanto Company,
St. Louis, Mo., a corporation of Delaware
No Drawing. Continuation-in-part of application Ser. No.
247,857, Dec. 28, 1962. This application Nov. 30, 1966,
Ser. No. 597,858
Int. Cl. C08f 45/58
U.S. Cl. 260—45.85                                     1 Claim

ABSTRACT OF THE DISCLOSURE

Ethylene polymers prepared by free-radical polymerization and containing phenolic antioxidants are stabilized against discoloration by the addition of an aliphatic saturated hydrocarbon carboxylic acid.

This application is a continuation-in-part of our application Ser. No. 247,857, filed Dec. 28, 1962, now abandoned.

This invention relates to discoloration inhibitors for solid ethylene polymers and copolymers prepared in the presence of free-radical catalysts and containing phenolic antioxidants.

Saturated hydrocarbon polymers such as polyethylene are more resistant to oxidation than unsaturated polymers but oxidize rapidly at elevated temperatures. The effects of oxidaiton on polyethylene are deterioration in physical properties, change in electrical properties, cracking and splitting, and development of rancid odor.

Practice is to incorporate substances capable of inhibiting or slowing the rate of oxidaiton in the polyethylene. These "antioxidants" however suffer the drawback that molded articles, pipe, sheeting, film, fiber, and other material fabricated from oxidation-resistant polyethylene darken and discolor after several or more days, even when the antioxidants are used in very low concentrations.

An object of this invention is to provide discoloration inhibitors for solid ethylene derived polymers that have been stabilized against oxidative degradation.

A more particular object is to provide discoloration inhibitors for solid ethylene derived polymers prepared in the presence of free-radical catalysts and containing phenolic antioxidants.

A specific object is to provide oxidation-resistant polyethylene compositions that are color stable over extended periods of time and use.

Other objects and advantages will be apparent in the following description.

The objects of this invention are obtained in the discovery that certain aliphatic carboxylic acids provide stabilized solid ethylene polymers, copolymers and blends thereof, permanent protection against discoloration as presented in detail below.

In accordance with this invention there is provided a discoloration-resistant stabilized ethylene polymer comprising a blend of (1) a normally solid free radical catalized ethylene polymer, (2) a stabilizing amount of a phenolic antioxidant and (3) an aliphatic saturated hydrocarbon carboxylic acid in the range of 0.001 to 10 percent by weight of polymer, the improvement being the addition of acid whereby the color characteristics of the stabilized polymer is improved.

The aliphatic carboxylic acids with which this invention is concerned and as defined in the claims are saturated; monocarboxylic or polycarboxylic; straight-chain, branched, or cyclic; and have any number of carbon atoms, though acids having 20 or fewer such atoms are commonly used and, in particular, those having 12 or fewer carbons. These acids can have aryl substitutents (e.g. phenyl), but aromatic carboxylic acids (i.e., benzoic acid and its derivatives) are excluded as being unsuitable. Particularly preferred are the straight-chain, monocarboxylic and dicarboxylic acids having not more than 8 carbon atoms. Of these the dicarboxylic acids such as oxalic acid, malonic acid, and succinic acid, the monocarboxylic acids such as acetic acid and phenylacetic acid seem most effective.

A general listing of carboxylic acids within the scope of this invention include: formic acid, acetic acid, phenylacetic acid, trimethylacetic acid, propionic acid, butyric acid, valeric acid, caproic acid, enanthic acid, isoenanthic acid, caprylic acid, pelargonic acid, capric acid, hendecanoic acid, lauric acid, tridecanoic acid, myristic acid, pentadecanoic acid, palmitic acid, margaric acid, stearic acid, nonadecanoic acid, arachidic acid, cyclopropanecarboxylic acid, cyclobutanecarboxylic acid, cyclopentanecarboxylic acid, 2-norcamphanecarboxylic acid, cyclohexanecarboxylic acid, cyclohexaneacetic acid, oxalic acid, malonic acid, succinic acid, glutaric acid, adipic acid, pimelic acid, suberic acid, azelaic acid, sebacic acid, hendecanedioic dodecanedionic acid, brassylic acid, thrapsic acid, 1,1,5-pentanetricarboxylic acid, 1,2,4-hexanetricarboxylic acid, and tricarboxylic acid.

An aliphatic carboxylic acid having several acid groups (carboxy radicals) can be partially esterified (preferably with alcohols having 5 or fewer carbon atoms) to give "acid-esters" (e.g., methyl hydrogen succinate). These partial esters are suitable for use in this invention so long as there remains at least 1 free (unesterified) acid group.

The aliphatic carboxylic acid can be employed in the range of 0.001 to 10.0 weight percent, based on the polymer but most often 0.01 to 1.0 weight percent is used. As a general rule about the same to about 10 times as much carboxylic acid discolorant is used as phenolic antioxidant. However wide variance is possible and workers skilled in the art can determine the best amount to use for any particular system.

The term ethylene polymers and copolymers refers to the normally solid high molecular weight polymers obtained from ethylene by high pressure polymerization in the presence of catalysts generally referred to as free-radical catalysts. Such polymers have a molecular weight of at least 5,000 and, preferably, 20,000 to 200,000 or more, and have a density not more than 0.940 and preferably 0.925 or lower.

The polymers of this invention differ materially from those ethylene polymers and copolymers obtained from ethylene by low pressure polymerization in the presence of either organo-metallic catalysts generally referred to as Ziegler catalysts or the supported metal oxide catalysts ranging from the readily apparent density differences to the more subtle qualitative differences. The low pressure polymers are more linear and less branched than the corresponding high pressure polymer. The low pressure polymer contains catalyst residues which are acidic in nature and have strong degrading effect on the polymer. Therefore one adds a neutralizer such as a polyvinyl chloride stabilizer to avoid the degrading effect which is manifested by the darkening or blackening color of the polymer when it is mechanically worked. Conversely a high pressure polymer is normally initiated with a peroxide and the only stabilizer required is an antioxidant to counteract the effect of the residual peroxide and oxygen of the air during processing. A phenolic antioxidant normally is employed and these antioxidants have chromophoric properties which give rise to pinks, greens and yellows in the stabilized polymer.

Polyethylene suitable for the practice of this invention can, for instance, readily be made by subjecting ethylene containing about 50 to 200 p.p.m. of oxygen to polymerization at very high pressures (e.g., about 15,000 to about 40,000 p.s.i.). Besides molecular oxygen other suitable free-radical catalysts are lauroyl peroxide, t-butyl peroxyisobutyrate, benzoyl peroxide, p-chlorobenzoyl peroxide, t-butyl peracetate, dicumyl peroxide, di-t-butyl peroxide, cumene hydroperoxide, alpha'-azo-bis isobutyronitrile, trimethylamine oxide hydrate, and other standard catalysts used to prepare high pressure polyethylene.

This invention is applicable also to normally solid polyethylene type materials which are copolymers and interpolymers of ethylene and one or more ethylenically unsaturated comonomer polymerizable therewith (under the conditions previously set forth) and employed in an amount not exceeding 25 percent by weight based on total monomer, copolymer where the comonomer does not exceed 15 percent are very desirable. For example suitable comonomers are styrene, vinyl chloride, vinyl acetate, vinylidene chloride, acrylonitrile, propylene, butene-1 and so forth.

Also included within this invention are poly-blends such as polyethylene/polypropylene, polyethylene/polyvinyl acetate, polyethylene/polyvinyl chloride, etc., where the polyethylene is present in at least 70 percent by weight based on the total blend.

The antioxidants employed are of the phenolic type commonly used to protect rubber. The simplest ones are phenols alkylated with isobutylene (e.g., 2,6-di-t-butyl-p-cresol) or with styrene. Other suitable stabilizers are the alkylated diphenolics which are condensation products of disubstituted phenols with various aldehydes [e.g., 2,2'-methylene bis (4-methyl-6-t-butyl phenol) and 4,4'-butylidene bis(6-t-butyl-m-cresol)]. The phenolic sulfides are probably the preferred antioxidants. These materials are reaction products of sulfur chloride and alkylated phenols and are usually bis(dialkylphenol) sulfides and can be either monosulfides or disulfides. Such antioxidants are particularly effective where neither alkyl group contains more than 12 carbon atoms and, preferably, 5 or less such atoms. A particularly preferred class of sulfides is one in which one of the alkyl groups is methyl and the other a branched-chain alkyl group. One such example is "Santowhite Crystals" which is 4,4'-thiobis(3-methyl-6-t-butylphenol). The following compounds are generally suitable: bis(2-methyl-3-isopropylphenol) monosulfide and disulfide, bis(2-methyl-3-t-butylphenol) monosulfide and disulfide, bis(2-methyl-5-t-amylphenol) monosulfide and disulfide, etc. Another class of phenolic antioxidants is represented by the dihydroxy phenols (e.g., hydroquinone monobenzyl ether and 2,5-di-t-amyl-hydroquinone).

The antioxidants are generally added to the polyethylene, ethylene containing copolymer, or polymeric blend containing polyethylene in small amounts. Very often less than 0.1 percent by weight based on the total polymer is sufficient and quantities as low as 0.001 weight percent exhibit a protective effect. On the other hand 1.0 weight percent or more can be used under certain circumstances.

The phenolic antioxidants and the aliphatic carboxylic acid discoloration inhibitors are added to the polymeric material on open rolls, internal mixers, screw-type extruders, and so forth. Preferably both the antioxidant and the discoloration inhibitor are incorporated in the polymeric material in one operation though they can be introduced separately.

The following examples are illustrative of the invention and unless otherwise specified all parts are by weight and all temperatures are expressed as degrees centigrade.

EXAMPLE 1

Polyethylene having a molecular weight of about 20,000 is prepared by conventional high pressure techniques in the presence of oxygen. This is protected against oxidation by incorporating 0.5 weight percent of "Ionol" (2,6-di-t-butyl-p-cresol).

Various aliphatic carboxylic acids in several concentrations are incorporated in portions of the antioxidant-containing polyethylene by extrusion at about 200 degrees centigrade (process takes about 15 min.).

The acids employed are: formic acid (0.5 weight percent), acetic acid (0.5, 1.0 and 5.0 weight percent), phenylacetic acid (0.5 and 1.0 weight percent), valeric acid (1.0 weight percent), palmitic acid (0.5 weight percent), cyclopropanecarboxylic acid (0.5 and 5.0 weight percent), oxalic acid (0.5, 1.0 and 5.0 weight percent), glutaric acid (0.5 weight percent), sebacic acid (0.5 weight percent), and 1,1,5-pentanetricarboxylic acid (0.5 weight percent).

As controls portions of the antioxidant-containing polyethylene are similarly extruded and comparison is made daily by visual observations.

After one day several controls developed light green discoloration.

After five days all controls show rather dark discoloration in comparison with the carboxylic acid treated samples which have remained white at all concentration levels. Final checks are made after six months and the carboxylic acid treated samples are still unchanged.

EXAMPLE 2

Polyethylene having a molecular weight of about 50,000 is prepared by conventional high pressure techniques in the presence of di-t-butyl peroxide. This is protected against oxidation by incorporating 0.1 weight percent of "Santowhite powder" [4,4'-butylidene bis(6-t-butyl-m-cresol)].

Various aliphatic carboxylic acids in several concentrations are incorporated in portions of the antioxidant-containing polyethylene by extrusion at about 250 degrees centigrade (the blending takes about 10 min.).

The acids employed are: acetic acid (0.1 and 1.0 weight percent), trimethylacetic acid (0.1 and 0.5 weight percent), propionic acid (0.5 weight percent), cyclopentanecarboxylic acid (0.1 weight percent), oxalic acid (0.1 and 1.0 weight percent), malonic acid (0.1 and 0.5 weight percent), and succinic acid (0.1 weight percent).

As controls portions of the antioxidant-containing polyethylene are similarily extruded and comparison made daily by visual observations.

After the first 24 hour period over half the controls are discolored. After 4 days all controls are discolored to some extent. The carboxylic acid containing samples remain white even after as long as 6 months.

EXAMPLE 3

Polythylene having a molecular weight of about 100,000 is prepared by conventional high pressure techniques in the presence of benzoyl peroxides. The polymer is protected against oxidation by incorporating 0.05 weight percent of "Santowhite Crystals" [4,4'-thiobis(3-methyl-6-t-butylphenol)].

Several aliphatic carboxylic acids in different concentrations are incorporated in portions of the antioxidant-containing polyethylene by extrusion at about 150 degrees centigrade (this requires about 15 min.).

The acids are: acetic acid (0.05 and 0.5 weight percent), phenylacetic acid (0.05 weight percent), propionic acid (0.10 weight percent), butyric acid (0.05 weight percent), caprylic acid (0.10 weight percent), cyclohexane acetic acid (0.05 weight percent), oxalic acid (0.05 and 0.10 weight percent, adipic acid (0.10 weight percent), and 1,2,4-hexanetricarboxylic acid (0.05 weight percent).

As controls portions of the antioxidant-containing polyethylene are similarly extruded and comparison is made with the acid-containing samples daily by visual observations.

After 2 days the controls show some red discloroation which becomes pronounced after 4 days in all the controls. The acid treated samples show no discoloration up to 6 months.

EXAMPLE 4

An ethylene-vinyl acetate copolymer (approximately 15 percent vinyl acetate) blend was prepared by drum tumbling three portions of the same lot of copolymer together. A portion of the resulting blend was used as control. The major portion was then stabilized by the addition of 4,4′-thiobis(3-methyl-6-t-butylphenol) [0.1 percent by weight of polymer] and used both as a test composition and as a masterbatch to prepare other test compositions. To portions of the resulting stabilized blend were added discoloration inhibitors as specified below. Each copolymer sample was then extruded through a one and one half inch extruder at a temperatuer of 190 degrees centigrade to obtain a uniform pelletized material. After a week the samples were inspected for color.

| Portion | Stabilizer added | Discoloration inhibitor | Amount (percent by weight of copolymer) | Color of pellets |
|---|---|---|---|---|
| 1 | No | | None | White. |
| 2 | Yes | | None | Orange-pink. |
| 3 | Yes | Oxalic acid | 0.1 | Whiter than Portion No. 1. |

The foregoing examples have been described in the above specification for the purpose of illustration and not limitation. Many other modifications and ramifications based on this disclosure will naturally suggest themselves to one skilled in the art. These are intended to be comprehended as within the scope of this invention.

What is claimed is:

1. A discoloration-resistant stabilized ethylene polymer comprising a blend of (1) a normally solid free-radical-catalyzed copolymer of ethylene and vinyl acetate containing at least 75 weight percent of ethylene, (2) a stabilizing amount of 4,4′-thiobis(3-methyl-6-t-butylphenol), and (3) oxalic acid in an amount in the range of 0.001 to 10% by weight of the copolymer, the improvement being the addition of acid whereby the color characteristics of the stabilized copolymer are improved.

References Cited

UNITED STATES PATENTS

| | | | |
|---|---|---|---|
| 2,455,910 | 12/1948 | Alderson | 260—23 |
| 2,672,485 | 3/1954 | Menn et al. | 260—624 |
| 2,801,225 | 7/1957 | Harding et al. | 260—45.95 |
| 2,985,617 | 5/1961 | Salyer et al. | 260—45.7 |
| 3,017,238 | 1/1962 | Levine et al. | 260—45.85 |
| 3,017,376 | 1/1962 | Bafford et al. | 260—23 |
| 3,027,351 | 3/1962 | Lichty | 260—45.85 |
| 3,413,262 | 11/1968 | Hecker et al. | 260—45.75 |
| 2,394,418 | 2/1946 | Quattlebaum | 260—45.85 |

DONALD E. CZAJA, Primary Examiner

V. P. HOKE, Assistant Examiner

U.S. Cl. X.R.

260—45.95